(12) United States Patent
Suyama et al.

(10) Patent No.: US 8,956,482 B2
(45) Date of Patent: Feb. 17, 2015

(54) CERAMICS COMPOSITE MEMBER AND METHOD OF PRODUCING THE SAME

(75) Inventors: Shoko Suyama, Kawasaki (JP); Yoshiyasu Ito, Yokohama (JP); Shigeki Maruyama, Yokohama (JP); Norihiko Handa, Narashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/424,315

(22) Filed: Mar. 19, 2012

(65) Prior Publication Data

US 2012/0267339 A1    Oct. 25, 2012

Related U.S. Application Data

(63) Continuation of application No. 11/947,132, filed on Nov. 29, 2007, now abandoned.

(30) Foreign Application Priority Data

Nov. 30, 2006    (JP) ................ P2006-324306

(51) Int. Cl.
*C03B 29/00*      (2006.01)
*C04B 35/573*     (2006.01)
(Continued)

(52) U.S. Cl.
CPC ......... *C04B 37/005* (2013.01); *C04B 2237/708* (2013.01); *C04B 2235/5436* (2013.01); *C04B 2235/5445* (2013.01); *C04B 2237/38* (2013.01); *C04B 2235/77* (2013.01);
(Continued)

(58) Field of Classification Search
CPC ........ B32B 18/00; B32B 37/14; B32B 37/12; B32B 2260/025; C04B 35/00; C04B 35/573; C04B 35/591; C04B 35/65; C04B 35/64; C04B 2235/52; C04B 2237/083; C04B 2237/365; C04B 2237/61
USPC ........................................... 156/89.11
See application file for complete search history.

(56) References Cited

U.S. PATENT DOCUMENTS 2,319,323 A     5/1943   Heyroth
4,617,072 A *  10/1986   Merz .................. 156/89.25
(Continued)

FOREIGN PATENT DOCUMENTS

DE    33 11 553 A1    10/1984
DE    34 12 332 A1    10/1984
(Continued)

OTHER PUBLICATIONS

Notice of Reasons for Rejection issued by the Japanese Patent Office on Dec. 11, 2012, for Japanese Patent Application No. 2006-324306, and English-language translation thereof.
(Continued)

*Primary Examiner* — Alex Efta
(74) *Attorney, Agent, or Firm* — Finnegan, Henderson, Farabow, Garrett & Dunner, L.L.P.

(57) ABSTRACT

A ceramics composite member includes a structure in which a first ceramic member and a second ceramic member are integrated with a joint portion. The joint portion has a texture in which a silicon phase having an average diameter of 0.05 μm or more and 10 μm or less is continuously provided in a network form in interstices of silicon carbide particles having an average particle diameter of 0.1 μm or more and 0.1 mm or less.

15 Claims, 5 Drawing Sheets

(51) Int. Cl.
*C04B 37/00* (2006.01)
*B82Y 30/00* (2011.01)
*C04B 33/34* (2006.01)
*C04B 35/56* (2006.01)

(52) U.S. Cl.
CPC ............ *C04B 35/573* (2013.01); *C04B 37/008* (2013.01); *C04B 2235/5427* (2013.01); *C04B 2235/5454* (2013.01); *C04B 2237/16* (2013.01); *C04B 2237/62* (2013.01); *C04B 2237/365* (2013.01); *C04B 2235/3826* (2013.01); *C04B 2237/368* (2013.01); *C04B 2235/96* (2013.01); *C04B 2235/48* (2013.01); *C04B 2235/422* (2013.01); *C04B 2235/424* (2013.01); *C04B 2237/348* (2013.01); *C04B 2235/9607* (2013.01); *C04B 37/006* (2013.01); *B82Y 30/00* (2013.01); *C04B 2237/363* (2013.01)
USPC ................. 156/89.11; 156/89.28; 501/88

(56) References Cited

U.S. PATENT DOCUMENTS

| | | | | |
|---|---|---|---|---|
| 5,070,049 | A | * | 12/1991 | Amino et al. .................. 501/88 |
| 7,235,506 | B2 | | 6/2007 | Suyama et al. |
| 2003/0030163 | A1 | * | 2/2003 | Lee et al. ....................... 264/13 |
| 2005/0255335 | A1 | * | 11/2005 | Suyama et al. ............... 428/698 |
| 2007/0225151 | A1 | | 9/2007 | Suyama et al. |

FOREIGN PATENT DOCUMENTS

| | | |
|---|---|---|
| EP | 0 357 491 | 3/1990 |
| EP | 357491 A2 * | 3/1990 |
| EP | 0 781 737 B1 | 7/1997 |
| EP | 0 827 942 A2 | 3/1998 |
| EP | 1 561 737 A1 | 8/2005 |
| GB | 2 022 490 A | 12/1979 |
| JP | 3-112871 | 5/1991 |
| JP | 5-79630 | 11/1993 |
| JP | 2005-022905 | 1/2005 |
| JP | 2005-041193 | 2/2005 |
| JP | 2006-27946 | 2/2006 |
| WO | WO 2004/007401 A1 | 1/2004 |

OTHER PUBLICATIONS

Iseki et al., "Joining of Dense Silicon Carbide Containing Free Silicon by Reaction-Sintering," Ceramics Society Journal (Jun. 1983), 91:259-264, and English-language Abstract.
European Search Report issued by the European Patent Office on Mar. 6, 2008, for European Patent Application No. 07023038.8.
S. Simner and B. Derby, "The Processing of Novel Reaction Bonded SiC Ceramics Using Alloyed Silicon Infiltrants," Fourth Euro-Ceramics, vol. 4, Oct. 1995, pp. 393-400, Gruppo Editoriale Faenza Editrice, Faenza, Italy.
Notice of Reasons for Rejection issued by the Japanese Patent Office on Apr. 26, 2011, for Japanese Patent Application No. 2006-324306 and English language translation thereof.
C.W. Forrest et al., "The Fabrication and Properties of Self-Bonded Silicon Carbide Bodies", Special Ceramics 5, 1972, pp. 99-123.
FC Report, 18, 2000, No. 3, pp. 62-64.

* cited by examiner

US 8,956,482 B2

CERAMICS COMPOSITE MEMBER AND METHOD OF PRODUCING THE SAME

CROSS-REFERENCE TO RELATED APPLICATIONS

This application is a continuation of U.S. application Ser. No. 11/947,132, filed Nov. 29, 2007, now abandoned. which is based upon and claims the benefit of priority from the prior Japanese Patent Application No. 2006-324306 filed on Nov. 30, 2006; the entire contents of both of which is incorporated herein by reference.

BACKGROUND OF THE INVENTION

1. Field of the Invention

The present invention relates to a ceramics composite member and method of producing the same.

2. Description of the Related Art

Structural ceramics are used as heat-resistant members and abrasion-resistant members because they excel in environment resistance, heat resistance and abrasion resistance and also have outstanding characteristics such as high rigidity, low thermal expansion and low specific gravity. Ceramic members such as alumina ($Al_2O_3$), zirconia ($ZrO_2$), silicon nitride ($Si_3N_4$) and silicon carbide (SiC) are being worked mainly toward practical use for semiconductor-related components such as jigs for semiconductor production equipment and others in these years. Besides, the ceramic members are being applied to industrial equipment such as nuclear, gas turbine and other energy equipment parts, structural parts for space, automobile engine parts, heat exchanger parts, pump parts, mechanical seal parts, bearing parts, sliding parts and the like.

The ceramic members are known that they are hardly produced into large parts and complex-shaped parts because they generally shrink by about 20% at the time of sintering. Then, it is attempted to produce large parts and complex-shaped parts by bonding plural ceramic members. As a method of bonding the ceramic members, there are known, for example, a method of bonding them with a brazing material containing active metal and a method of bonding the ceramic members with a brazing material after metallizing their surfaces. But, such bonding methods have a disadvantage that the heat resistance and strength of the parts are limited depending on a metal layer which is present as a bonding layer.

In contrast to the bonding method using the brazing material, there is known a method of bonding plural ceramic members by utilizing reaction sintering of silicon carbide. Japanese Patent Publication No. HEI 5-079630 (KOKOKU) describes a method of bonding a silicon carbide body and a porous body of silicon carbide with an organic binder containing silicon carbide particles. The silicon carbide body and the porous body of silicon carbide are overlaid with the organic binder containing the silicon carbide particles therebetween, and they are impregnated with silicon melted from the top surface of the porous body of silicon carbide. The melted silicon impregnated through the pores in the porous body of silicon carbide and the carbon in the organic binder are reacted to produce the silicon carbide layer (bonding layer) so as to join the silicon carbide body and the porous body of silicon carbide.

But, the conventional bonding method using the reaction sintering of silicon carbide has a disadvantage that applicable component shapes are limited because the melted silicon impregnates through the pores in the porous body of silicon carbide. It also has a disadvantage that the strength of the bonded body cannot be enhanced sufficiently because the process of producing the silicon carbide in the bonding layer cannot be controlled. For example, the reaction-sintering layer as the bonding layer has a microheterogeneous structure, and many pores and coarse free silicon phases are produced in the reaction-sintering layer. They are causes to degrade the strength of the bonded body.

Pamphlet of (PCT) International Publication No. WO-A1 2004/007401 and JP-A 2005-022905 (KOKAI) describe a method of bonding plural component units including a silicon-silicon carbide composite sintered body via a reaction-sintering layer (silicon-silicon carbide composite material layer). Here, plural silicon-silicon carbide composite sintered bodies (or shaped bodies containing silicon carbide and carbon) are adhered with an organic adhesive, and the bonded portion effected with the organic adhesive is impregnated with melted silicon. And, plural component units are bonded with the bonding layer which is mainly composed of silicon carbide particles which are produced by reacting the carbon in the organic adhesive with the melted silicon and a free silicon phase present among them.

The bonding method using the organic adhesive can improve denseness of the bonding layer, controllability of the microstructure and the like because the free silicon phase is present in a network form in the interstices of the silicon carbide particles configuring the bonding layer. Thus, it becomes possible to enhance bonding strength in comparison with the method of impregnating with the melted silicon through the pores in the porous body of silicon carbide. But, the generation of the silicon carbide particles configuring the bonding layer based on only the carbon in the organic adhesive has a drawback that it is poor in reproducibility of bonding strength.

In other words, the carbon in the organic adhesive involves volume expansion when it reacts with the melted silicon, and the silicon carbide particles produced originating from the initial resin structure tend to aggregate. Therefore, the interstices of the silicon carbide particles tend to become heterogeneous, and there is a possibility that the free silicon phase segregates. The free silicon phase has less strength in comparison with the silicon carbide particles, and if the free silicon phase segregates, the bonding layer tends to have variable strength. Thus, it is a cause of lowering of the reproducibility of the bonding strength of a bonded part applying the bonding method using the organic adhesive.

SUMMARY OF THE INVENTION

According to an aspect of the present invention, there are provided a ceramics composite member with mechanical properties such as strength enhanced with a good reproducibility by making a bonding layer homogeneous and minute, and a method of producing the same.

A ceramics composite member according to an aspect of the invention includes: a first ceramic member; a second ceramic member; and a joint portion which couples the first ceramic member and the second ceramic member and has a texture including silicon carbide particles, which have an average particle diameter of 0.1 µm or more and 0.1 mm or less, and a silicon phase, which is continuously provided in network form in interstices of the silicon carbide particles and has an average diameter of 0.05 µm or more and 10 µm or less.

A method of producing a ceramics composite member according to an aspect of the invention includes: adhering a first ceramic member and a second ceramic member with an adhesive containing at least silicon carbide powder and an organic resin; heat-treating a bonding portion based on the adhesive to carbonize the adhesive; and impregnating the bonding portion with melted silicon to couple the first ceramic member and the second ceramic member with a joint portion which is formed by reaction-sintering the bonding portion.

A method of producing a ceramics composite member according to another aspect of the invention includes: adhering shaped bodies each containing silicon carbide powder and carbon powder or the shaped body and a ceramics sintered body with an adhesive containing at least silicon carbide powder and an organic resin; heat-treating a bonding portion based on the adhesive to carbonize the adhesive; and impregnating the shaped bodies and the bonding portion with melted silicon to couple silicon-silicon carbide composite sintered bodies which are formed by reaction-sintering the shaped bodies or the silicon-silicon carbide composite sintered body and the ceramics sintered body with a joint portion which is formed by reaction-sintering the bonding portion.

DETAILED DESCRIPTION OF THE INVENTION

Figure 1:
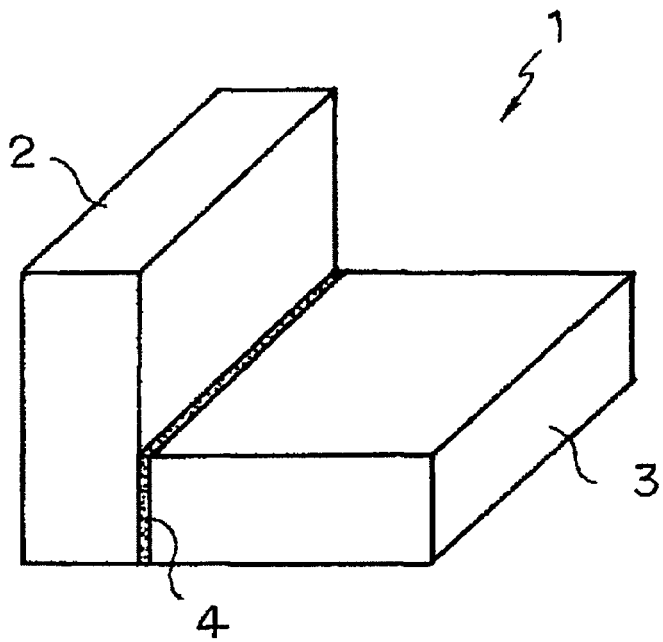
FIG. 1 is a perspective view showing a ceramics composite member according to an embodiment.
Figure 2:
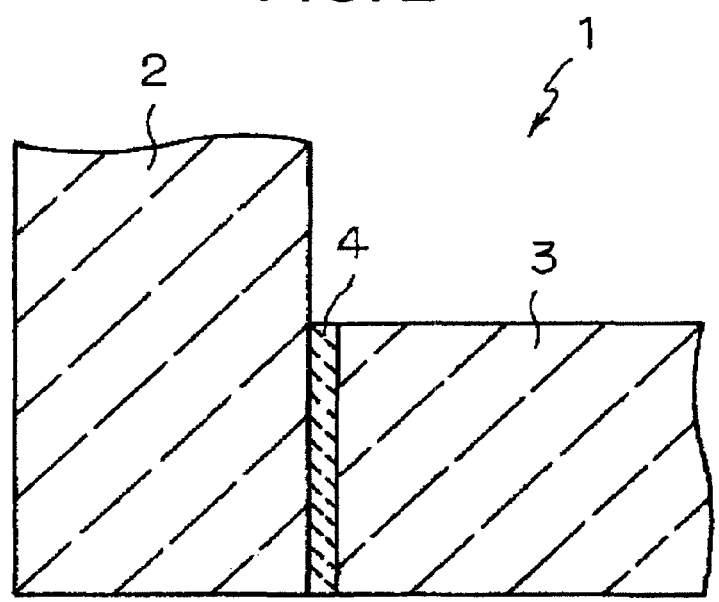
FIG. 2 is a sectional view showing a magnified structure of the ceramics composite member shown in FIG. 1.

Embodiments of the present invention will be described below with reference to the drawings. FIG. 1 is a perspective view showing a structure of the ceramics composite member according to an embodiment of the invention, and FIG. 2 is a sectional view showing a magnified part. A ceramics composite member 1 shown in the drawings includes a first ceramic member 2 and a second ceramic member 3. The first and second ceramic members 2 and 3 are coupled (bonded) via a joint portion 4.

Figure 4:
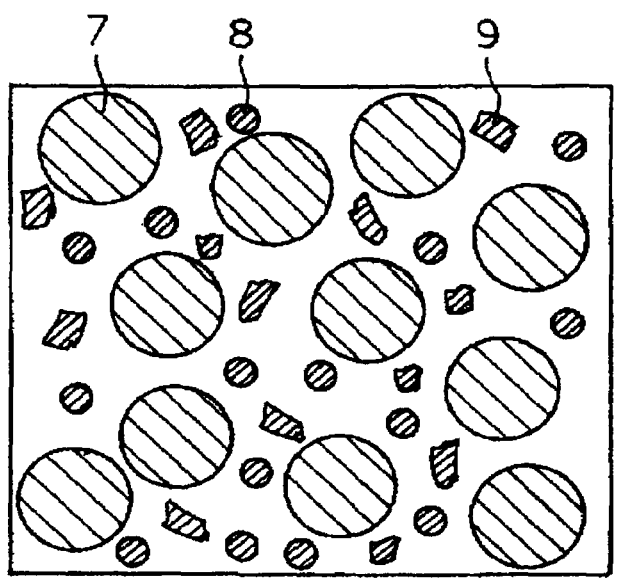
FIG. 4 is a sectional view showing a state before an impregnation with melted Si in the joint portion shown in FIG. 3.

As indicated by the magnified view of FIG. 4, the joint portion 4 has a texture in which a silicon phase (free Si phase) 6 is continuously provided in network form in interstices of silicon carbide particles (SiC particles) 5. Here, the composite member 1 having the two ceramic members 2 and 3 coupled is shown, but the number of ceramic members configuring the ceramics composite member 1 is not limited to two. The number of ceramic members may be three or more.

The first and second ceramic members 2 and 3 are not particularly limited, and the same or different kinds of ceramics sintered bodies selected from carbide, nitride, oxide, boride, silicide and their composites can be applied. Specific examples of the ceramic members include a silicon carbide (SiC) sintered body, a silicon-silicon carbide (Si—SiC) composite sintered body, a silicon nitride ($Si_3N_4$) sintered body, a sialon (Si—Al—O—N) sintered body, an alumina ($Al_2O_3$) sintered body, a zirconia ($ZrO_2$) sintered body, and their composite sintered bodies.

The first and second ceramic members 2 and 3 can be selected appropriately depending on the parts and usage to which the ceramics composite member 1 is applied. Especially, the application of the silicon-silicon carbide composite sintered body and the silicon carbide sintered body having the same material as the joint portion 4 can improve the strength of the ceramics composite member 1.

Figure 3:
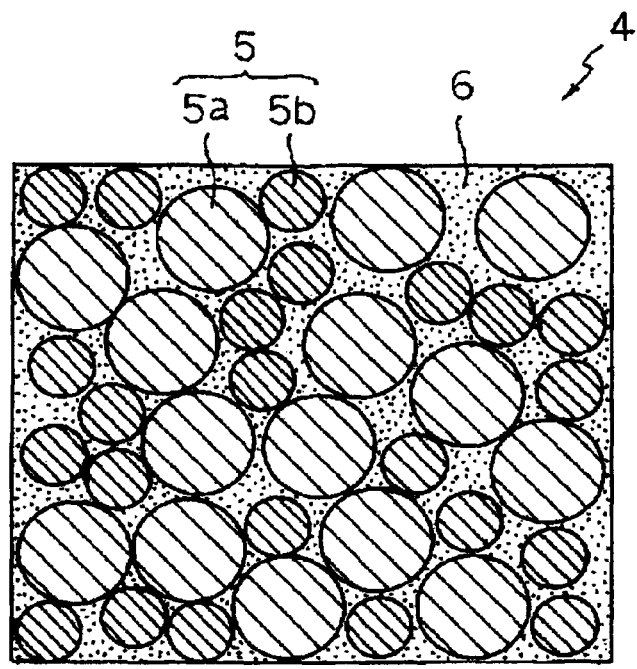
FIG. 3 is a sectional view showing a magnified structure of the joint portion of the ceramics composite member shown in FIG. 1.

The joint portion 4 has the texture in which the free Si phase 6 is continuously provided in the network form in the interstices of the SiC particles 5. The joint portion 4 can be obtained by heat-treating (heat treatment for carbonization by thermally decomposing an organic resin) an adhesive layer containing at least silicon carbide powder and an organic resin, and impregnating with melted silicon (Si) to perform reaction-sintering. The adhesive layer may contain carbon powder. The joint portion 4 includes first SiC particles 5a which are based on the silicon carbide powder compounded with the adhesive layer and second SiC particles 5b which are produced by reacting the melted Si with carbon derived from the carbon powder and the organic resin compounded with the adhesive layer as shown in FIG. 3.

The SiC particles 5 configuring the joint portion 4 are controlled so that they have an average particle diameter of 0.1 μcm or more and 0.1 mm or less as a whole including the first and second SiC particles 5a, 5b. If the SiC particles 5 have an average particle diameter exceeding 0.1 mm, the microstructure of the joint portion 4 becomes heterogeneous, and the free Si phase 6 having less strength than the SiC particles 5 tends to be segregated. The strength and toughness of the joint portion 4 are degraded. Therefore, the strength of the ceramics composite member 1 which has the first ceramic member 2 and the second ceramic member 3 joined via the joint portion 4 cannot be expressed satisfactorily.

The strength of the joint portion 4 also lowers when the SiC particles 5 have an average particle diameter of less than 0.1 μm. The SiC particles 5 having an average particle diameter of less than 0.1 μm tend to aggregate and are hardly dispersed into the adhesive, so that a stable bonding layer is hardly obtained in view of the production process. Therefore, the strength and yield of the ceramics composite member 1 become low, and its reliability and endurance are also degraded. It is more desirable to control so that the SiC particles 5 have an average particle diameter of 0.5 to 50 μm. The average particle diameter of the SiC particles 5 is a value determined by mirror-finishing an arbitrary cross section of the joint portion 4, observing its texture through an optical microscope (metallurgical microscope) or an electron microscope, and performing image processing on a magnified picture of the texture.

The shapes of the first SiC particles 5a blended as an aggregate and the second SiC particles 5b produced by reaction-sintering are controlled to have the average particle diameter of the SiC particles 5 in a range of 0.1 μm or more and 0.1 mm or less. FIG. 4 shows a state of the adhesive layer (porous layer) before the impregnation with the melted Si. Silicon carbide powder 7 has substantially no grain growth in the melted Si impregnation step. If the first SiC particles 5a based on the silicon carbide powder 7 have a particle diameter smaller than that of the second SiC particles 5b, it is hard to obtain a homogeneous composite texture (composite texture having the free Si phase 6 continuously provided in the network form in the interstices of the SiC particles 5). If the first SiC particles 5a have a particle diameter excessively larger than that of the second SiC particles 5b, the size of the free Si phase 6 does not become homogeneous, so that the strength of the joint portion 4 lowers.

Carbon powder 8 and a carbon component 9 derived from the organic resin expand in volume when they react with the melted Si to generate SiC (the second SiC particles 5b). Therefore, it is important to control the particle diameter of the carbon powder 8 to be blended into the adhesive layer and to control the size of the carbon component 9 to be formed by heat-treating the organic resin considering the particle diameter of the first SiC particles 5a. Especially, it is important to control the size of the carbon component 9. If the second SiC particles 5b have a particle diameter larger than that of the first SiC particles 5a, the free Si phase 6 has a heterogeneous distributed state.

The size of the carbon component 9 derived from the organic resin can be miniaturized by, for example, blending appropriate amounts of the silicon carbide powder 7 and the carbon powder 8 into the adhesive and controlling the heat treatment conditions for carbonization of the organic resin. Blending of the silicon carbide powder 7 into the adhesive layer makes it possible to have the organic resin uniformly and finely in the gap among the powder grains. The distributed state of the organic resin can be further made uniform and fine by blending the carbon powder 8 into the adhesive layer.

The size of the carbon component 9 can be miniaturized by heat-treating the organic resin when the carbon component 9 is formed. Besides, the carbon component 9 can be suppressed from aggregating. And, the adhesive layer containing the carbon component 9, the carbon powder 8 and the silicon carbide powder 7 is impregnated with the melted Si, and reaction-sintering is performed, so that it becomes possible to control the average particle diameter of the SiC particles 5 as a whole to fall in a range of 0.1 μm or more and 0.1 mm or less.

The free Si phase 6 is continuously provided in the network form in the interstices of the SiC particles 5. It is important that the free Si phase 6 has a continuous network structure. If the network structure of the free Si phase 6 is separated, the occurrence of a choking phenomenon (phenomenon that the melted Si supply routes are cut to stop the reaction of carbon) is induced to increase a residual carbon amount, and the strength of the joint portion 4 is lowered. A compact joint portion 4 can be obtained by continuously disposing the free Si phase 6 in the interstices of the SiC particles 5. Besides, the joint portion 4 preferably has a porosity of 5% or less. If the joint portion 4 has a porosity exceeding 5%, the strength of the joint portion 4 becomes variable greatly and the strength of the ceramics composite member 1 also becomes variable greatly.

The free Si phase 6 is determined to have an average diameter of 0.05 μm or more and 10 μm or less. The average diameter of the free Si phase 6 is equivalent to an average distance among the SiC particles 5. The average diameter of the free Si phase 6 indicates a value determined as follows. First, the ceramics composite member 1 having the joint portion 4 is heated to 1600° C. under reduced pressure to remove free Si contained in the joint portion 4. It is assumed that the average diameter of the free Si phase 6 indicates an average value of the diameters determined by a mercury porosimetry assuming that the diameters of fine pores formed by removing the free Si are cylinders. The obtained value agrees with the result obtain by observing the cross-sectional microstructure of the joint portion 4 under a metallurgical microscope or a SEM.

The fact that the free Si phase 6 has a small average diameter means that the free Si phase 6 having low strength is miniaturized. It also means that the free Si phase 6 is distributed homogeneously in the interstices of the SiC particles 5. The interstices of the SiC particles 5 is thoroughly filled with the free Si phase 6. The strength of the joint portion 4 and the ceramics composite member 1 can be improved with a good reproducibility by controlling so that the free Si phase 6 has an average diameter of 10 μm or less. If the free Si phase 6 has an average diameter of less than 0.05 μm, it is hard to keep a continuous network structure. Thus, holes and free carbon tend to be formed in the joint portion 4, and the strength of the joint portion 4 becomes variable.

The average diameter of the free Si phase 6 is controlled by optimizing the particle diameter and the compounding ratio of the silicon carbide powder 7 and the carbon powder 8 in the adhesive layer which becomes a source for forming the joint portion 4. The silicon carbide powder 7 has substantially no grain growth in the melted Si impregnation step. The carbon powder 8 and the carbon component 9 present in the interstices of the first SiC particles 5a based on the silicon carbide powder 7 are reacted with the melted Si to homogenize the distributed state of the free Si phase 6. Besides, the free Si phase 6 is suppressed from segregating. Thus, it becomes possible to obtain the free Si phase 6 which is fine and uniform.

But, if the silicon carbide powder 7 and the carbon powder 8 are blended in excessively large amounts into the adhesive, adhesiveness and bonding strength are degraded. Therefore, it is desirable that the amounts of the silicon carbide powder 7 and the carbon powder 8 added to the organic resin, which is a main constituting material of the adhesive, and also the particle diameters of the silicon carbide powder 7 and the carbon powder 8 are adjusted appropriately. Thus, it becomes possible that the free Si phase 6 is uniformly miniaturized, and the continuous network structure of the free Si phase 6 can be kept stably.

In a case where the SiC particles 5 in the joint portion 4 are produced by only the reaction of the carbon component 9 derived from the organic resin, the carbon component 9 tends to aggregate because of the original resin structure. Therefore, a choking phenomenon occurs, or the free Si phase 6 becomes nonuniform and its average diameter increases. The free Si phase 6 has less strength in comparison with the SiC particles 5, so that the segregation of the free Si phase 6 becomes a cause of the degradation or variation in strength of the joint portion 4. Blending of the silicon carbide powder 7 and the carbon powder 8 into the adhesive suppresses the carbon component 9 derived from the organic resin from aggregating, and the miniaturized free Si phase 6 can be obtained.

It is desirable that the content of the free Si phase 6 in the joint portion 4 is in a range of 5 to 85 mass. If the content of the free Si phase 6 exceeds 85 masse, the strength of the joint portion 4 and the ceramics composite member 1 cannot be improved with a good reproducibility. If the content of the free Si phase 6 is less than 5 wt %, the network structure is separated, and pores and free carbon tend to generate. In such a case, the strength of the joint portion 4 is degraded. The content of the free Si phase 6 is preferably in a range of 5 to 75 mass, and more preferably in a range of 10 to 50 mass. The content of the free Si phase 6 can be calculated on the basis of the theoretical density of Si and SiC from the result of image processing on the texture-observed pictures and the density of the joint portion 4.

The thickness of the joint portion 4 is preferably in a range of 5 μm or more and 5 mm or less as an average thickness. It is hard to produce the joint portion 4 having an average thickness of less than 5 μm in view of a production process, and a portion, where the joint portion 4 is insufficiently formed, becomes defective, and the strength and reliability of the joint portion 4 degrade, and those of the ceramics composite member 1 also degrade. If the average thickness of the joint portion 4 exceeds 5 mm, the joint portion 4 becomes a cause of degradation of the strength, and the strength and reliability of the ceramics composite member 1 are degraded. It is desirable that the average thickness of the joint portion 4 is made thin in such a range that a uniform state can be obtained. The joint portion 4 desirably has an average thickness of 1 mm or less, and more preferably 0.5 mm or less.

Figure 5:
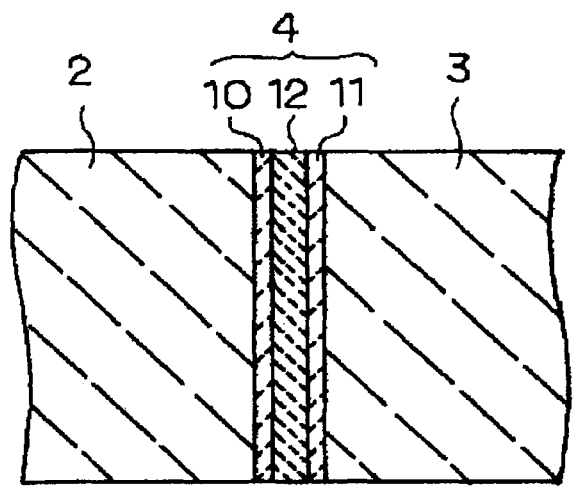
FIG. 5 is a sectional view showing a magnified joint portion of the ceramics composite member shown in FIG. 1.

The joint portion 4 preferably has a three-layer structure as shown in FIG. 5. The joint portion 4 shown in FIG. 5 has first and second side layers 10, 11, which are in contact with the first and second ceramic members 2 and 3, and an intermediate layer 12 which is positioned between them. The content of the free Si phase 6 in the intermediate layer 12 is different from those of the first and second side layers 10, 11. The content of the free Si phase 6 in the intermediate layer 12 is larger than in the first and second side layers 10, 11. It is desired that the intermediate layer 12 has a free Si composition ratio of 10 to 85% higher than the first and second side layers 10, 11. The center layer 12 has preferably a thickness of 3 μm or more and 3 mm or less.

The first and second side layers 10, 11 contain the free Si phase 6 in an amount smaller than that in the intermediate layer 12. A bonding strength to the first and second ceramic members 2, 3 can be further enhanced by the joint portion 4 having the side layers 10, 11. Therefore, the reliability and endurance of the ceramics composite member 1 can be improved furthermore. The joint portion 4 having the first and second side layers 10, 11 and the intermediate layer 12 can be obtained by controlling the structure of the porous layer mainly comprising carbon according to the heat treatment conditions and the like for the adhesive layer. Besides, the adhesion strength of the side layers 10, 11 can also be enhanced by increasing the surface roughness of the adhered surfaces of the first and second ceramic members 2, 3.

The ceramics composite member 1 of this embodiment controls the microstructure of the joint portion 4 for coupling the first and second ceramic members 2 and 3. Specifically, it controls the average particle diameter of the SiC particles 5 configuring the joint portion 4, and the network structure and the average diameter of the free Si phase 6 present in the interstices of the SiC particles 5. Thus, the strength of the joint portion 4 can be enhanced with a good reproducibility. The joint portion 4 typically has properties such as a Vickers hardness of Hv900 to 2200 and a four-point bending strength of 250 to 1400 MPa. The four-point bending strength of the joint portion 4 indicates a value obtained by measuring the four-point bending strength of the composite member 1 with the joint portion 4 determined at the center.

The ceramics composite member 1 having the above-described joint portion 4 can enhance the mechanical properties such as a strength and the like with a good reproducibility, so that it can be applied to various types of members and parts which are required to have high strength. Especially, it contributes greatly to provision of high strength to large structures, complex-shaped parts and the like. The ceramics composite member 1 can be applied to various types of equipment parts and equipment members such as jigs for semiconductor manufacturing devices, semiconductor-associated parts (heatsink, dummy wafer, etc.), high-temperature structural members for gas turbines, aerospace and aeronautical structural members, mechanical seal members, brake members, sliding parts, mirror parts, pump parts, heat exchanger parts, chemical plant component parts and the like, and especially suitably used for the equipment parts and members which are required to have high strength.

Then, an embodiment of a method of producing a ceramics composite member of the invention will be described. The method of producing the ceramics composite member 1 of the invention is classified broadly into a first method for bonding plural ceramics sintered bodies and a second method for bonding in a stage that at least one of them is a shaped body including silicon carbide powder and carbon powder. The first method will be described in detail with reference to FIG. 6A through FIG. 6D.

Figure 6A:
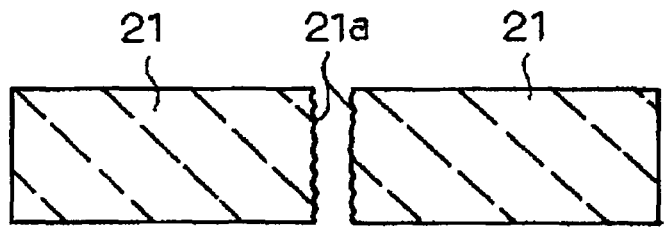
FIGS. 6A, 6B, 6C and 6D are sectional views showing a production process of the ceramics composite member according to a first embodiment.

As shown in FIG. 6A, two or more ceramics sintered bodies 21 are prepared. For the ceramics sintered bodies 21, the same or different kinds of ceramics sintered bodies selected from carbide, nitride, oxide, boride, silicide and their composites are used. Specific examples of the ceramics sintered bodies 21 are as described above. Adhered surfaces 21a of the ceramics sintered bodies 21 are preferably subjected to a blast treatment or an etching treatment to previously increase the surface roughness. Thus, adhesiveness of the joint portion 4 formed by impregnation with the melted Si and the ceramics sintered bodies 21 and also their bonding strength can be enhanced.

Figure 6B:
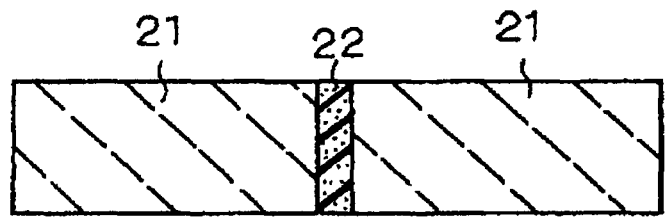

Then, as shown in FIG. 6B, the two ceramics sintered bodies 21 are adhered with an adhesive 22 containing silicon carbide powder and an organic resin. The adhesive 22 may also contain carbon powder. The adhesive 22 is present as an adhesive layer between the ceramics sintered bodies 21. The organic resin as an adhesive component of the adhesive 22 is preferably a thermosetting resin such as a phenol resin, a melamine resin, an unsaturated polyester resin, an epoxy resin, a polyurethane resin, a polyimide resin or the like. Thus, the layer shape of the adhesive 22 before the impregnation with the melted Si can be kept stably, and a filling property and dispersibility of the silicon carbide powder and the carbon powder in the adhesive 22 can be improved.

The silicon carbide powder contained in the adhesive 22 desirably has an average particle diameter of 0.1 to 100 μm. If the silicon carbide powder has an average particle diameter of less than 0.1 μm, the distributed state of the silicon carbide powder 7, the carbon powder 8 and the carbon component 9 in the porous layer (FIG. 4) formed by the heat treatment of the adhesive 22 tends to become heterogeneous. Thus, the dispersed state of the second SiC particles 5b and the free Si phase 6 in the joint portion 4 (FIG. 3) formed with the porous layer impregnated with the melted Si becomes heterogeneous. If the average particle diameter of the silicon carbide powder exceeds 100 μm, the size of the free Si phase 6 becomes large, and there is a possibility that the strength of the joint portion 4 cannot be enhanced sufficiently.

The carbon powder preferably has an average particle diameter of 0.08 to 20 μm. If the carbon powder has an average particle diameter of less than 0.08 μm, it tends to aggregate, and the distributed states of the second SiC particles 5b and the free Si phase 6 in the joint portion 4 (FIG. 3) become heterogeneous. If the average particle diameter of the carbon powder exceeds 20 μm, a choking phenomenon tends to occur, and the strength of the joint portion 4 might be degraded. Besides, the free Si phase 6 has a large average diameter, and the strength of the joint portion 4 is degraded or becomes variable.

It is preferable that the adhesive 22 contains the silicon carbide powder in a range of 5 to 80 mass % with respect to a total amount of the silicon carbide powder and the carbon component derived from the carbon powder and the organic resin. A mass ratio of the silicon carbide powder and the carbon component derived from the carbon powder and the organic resin is preferably determined as SiC:C=5 to 80:95 to 20, and more preferably SiC:C=10 to 70:90 to 30. If the ratio of the silicon carbide powder is less than 5 mass %, the distributed state of the SiC particles 5 and the free Si phase 6 in the joint portion 4 becomes heterogeneous. Meanwhile, if the ratio of the silicon carbide powder exceeds 80 mass %, the porosity of the joint portion 4 increases, and the strength cannot be expressed satisfactorily. Thus, the ceramics sintered bodies 21, 22 are mutually adhered with the adhesive 22.

Figure 6C:
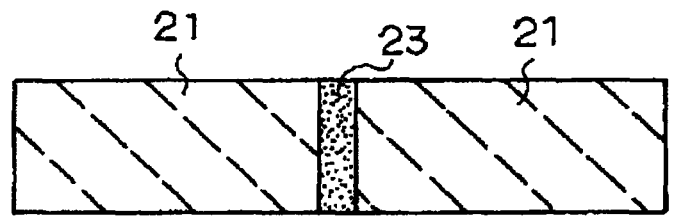

Then, as shown in FIG. 6C, the adhesive layer 22 is carbonized by heat-treating, and the adhesive layer 22 becomes a porous layer 23 accordingly. In other words, the organic resin is carbonized by thermally decomposing, and the adhesive layer 22 is changed to a porous body. The porous layer 23 functions as a preliminary joint portion. The heat treatment to change the adhesive layer 22 to the porous body is preferably performed in vacuum or an inert gas atmosphere at a temperature in a range of 400 to 2000° C.

It is desirable that the porous layer 23 has a porosity of 20 to 80%. If the porosity of the porous layer 23 is less than 20%, the supply routes for the melted Si are cut to cause a choking phenomenon, and a residual carbon amount of the joint portion 4 increases, or the production of the silicon carbide from carbon accompanies a volume expansion to cause cracks easily. If the porosity of the porous layer 23 exceeds 80%, the amount of the free Si phase increases. Such phenomena become the cause of degradation of the strength of the joint portion 4. Besides, if the porosity is excessively high, the preliminary joint portion (porous layer) 23 before the impregnation with the melted Si tends to have cracks or the like, and the production yield and strength of the ceramics composite member 1 are degraded.

Figure 6D:
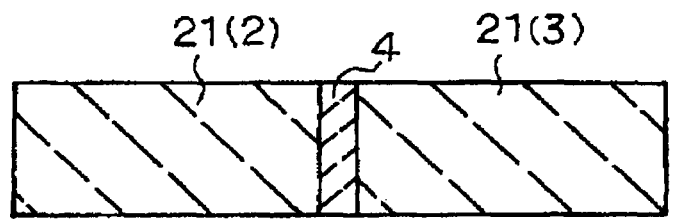

Then, the porous layer 23 as the preliminary joint portion is heated to a temperature of the melting point or more of Si, and the porous layer 23 in the heated state is impregnated with the melted Si. The melted Si impregnation step heats the porous layer 23 as the preliminary joint portion to, for example, a temperature of 1400° C. or more and impregnates it with the melted Si in vacuum or in an inert atmosphere. By the melted Si impregnation step, the porous layer 23 as the preliminary joint portion is subjected to reaction-sintering to form the joint portion 4. In other words, as shown in FIG. 6D, the two ceramics sintered bodies 21 are coupled with the joint portion 4 formed by the reaction-sintering of the porous layer 23 to produce the ceramics composite member 1.

The carbon powder and the carbon component derived from the organic resin present in the porous layer 23 react in contact with the melted Si at a high temperature to produce silicon carbide (second SiC particles 5b). The silicon carbide powder blended into the adhesive 22 has substantially no grain growth and becomes the first SiC particles 5a. The SiC particles produced by the reaction-sintering become the second SiC particles 5b having an average particle diameter smaller than that of the first SiC particles 5a based on the silicon carbide powder which are blended as an aggregate into the adhesive 22. Besides, the Si which was not involved in the reaction is continuously present as the free Si phase 6 in the network form in the interstices of the first and second SiC particles 5a, 5b.

By applying the above-described bonding process, the two ceramics sintered bodies 21 can be coupled by the joint portion 4 formed with the silicon-silicon carbide composite material which includes the SiC particles 5 having an average particle diameter of 0.1 μm or more and 0.1 mm or less, and the free Si phase continuously provided in network form in the interstices of the SiC particles 5 and having an average diameter of 0.05 μm or more and 10 μm or less. The silicon-silicon carbide composite material configuring the joint portion 4 has a texture which is composed of the first SiC particles 5a, the second SiC particles 5b and the free Si phase 6 continuously provided in the network form in the interstices of the SiC particles 5a, 5b as described above.

The joint portion 4 excels in bonding strength to the ceramics sintered bodies 21 and also excels in its own strength and reproducibility. Therefore, the two ceramics sintered bodies 21 can be joined with a high strength, and the strength of the ceramics composite member 1 after bonding can be enhanced with a good reproducibility. Besides, the cost required for bonding can be reduced. Therefore, the ceramics composite member 1 suitable for complex-shaped or large ceramic members can be provided with a high strength at a low cost. The ceramics composite member 1 can be applied as a various types of parts and members.

Figure 7A:
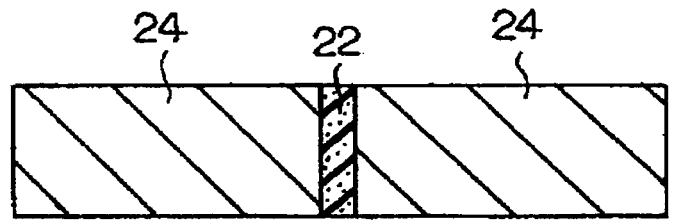
FIGS. 7A, 7B, 7C and 7D are sectional views showing a production process of the ceramics composite member according to a second embodiment.

Then, the second coupling method (bonding method) will be described in detail with reference to FIG. 7A through FIG. 7D. As shown in FIG. 7A, shaped bodies 24 containing silicon carbide powder and carbon powder are prepared. The shaped bodies 24 may be applied to each of two to-be-bonded members (ceramic members 2, 3). One of two to-be-bonded members may be the ceramics sintered body 21 in the same way as in the first method.

FIG. 7A shows a state that the shaped bodies 24 are applied to the two to-be-bonded members. The shaped bodies 24 become a silicon-silicon carbide composite sintered body by reaction-sintering. In a case where the ceramics sintered body is applied to one of the to-be-bonded members, its type is not particularly limited. The ceramics sintered body is not limited to a silicon carbide sintered body or a silicon-silicon carbide composite sintered body but may be a nitride based or oxide based ceramics sintered body.

For example, the shaped bodies 24 are produced as follows. First, silicon carbide powder and carbon powder are mixed at a prescribed ratio. It is desirable that the compounding ratio of the silicon carbide powder and the carbon powder is in a range of 10:1 to 10:10 in mass ratio. If the amount of the carbon powder is smaller than the above range, the produced amount of SiC decreases, the size of the free Si phase increases, and the strength of the silicon-silicon carbide composite sintered body might be degraded. Meanwhile, if the amount of the carbon powder is excessively large, the volume expansion amount increases at the time of reaction-sintering, and cracks tend to be produced locally. In such a case, the strength might be degraded. A known organic binder may be added to the mixture powder if necessary.

Then, the mixture powder of the silicon carbide powder and the carbon powder is formed into shaped bodies having a desired shape by press forming. As a press forming method, powder pressing, press casting or the like can be applied. In a case where the powder pressing is applied, the pressure is preferably in a range of 0.5 to 2 MPa. For the press forming of powder, die pressing, rubber pressing, cold isotropic pressing or the like is applied. In a case where the press casting is applied, it is desirable that the mixture powder is dispersed into water or an organic solvent to prepare a slurry, and the slurry is subjected to casting under a pressure of 0.5 to 10 MPa. The application of the press forming provides shaped bodies having an appropriate density (filled state of the powder).

Thus, the two shaped bodies 24 are prepared as the to-be-bonded members. Otherwise, the shaped body 24 is prepared as one of the two to-be-bonded members. In such a case, a ceramics sintered body is prepared as the other. And, the two shaped bodies 24 (or the shaped body 24 and the ceramics sintered body 21) are adhered with the adhesive 22 containing the silicon carbide powder and the organic resin, and the adhesive 22 also containing the carbon powder as shown in FIG. 7A. It is preferable that the adhesive 22 is configured in the same manner as the first method. It is also preferable that the adhered surfaces are treated in the same manner as the first method.

Figure 7B:
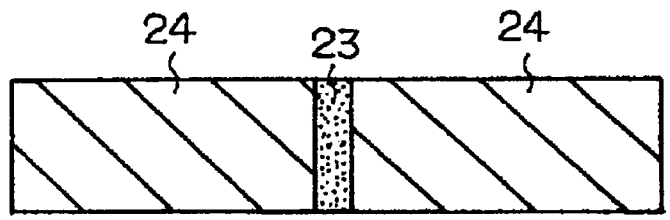
Figure 7C:
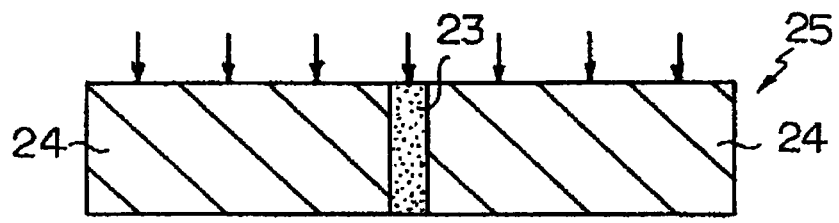

As shown in FIG. 7B, the adhesive layer 22 is subjected to the heat treatment in the same manner as the first method to form the porous layer 23. Thus, the two shaped bodies 24 are temporarily coupled with the porous layer 23 to produce a preliminary coupling member 25. And, as shown in FIG. 7C, the preliminary coupling member 25 is heated to a temperature of the melting point or more of Si, and the preliminary coupling member 25 in the heated state is entirely impregnated with the melted Si. In a case where one of the to-be-bonded members is a ceramics sintered body, the shaped bodies 24 and the porous layer 23 are impregnated with the melted Si. The melted Si impregnation step is performed in the same manner as the above-described first method.

Figure 7D:
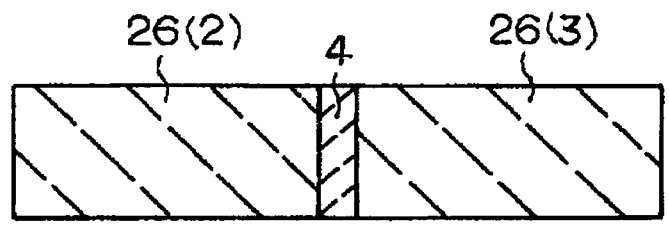

In the melted Si impregnation step, the two shaped bodies 24 are respectively subjected to reaction-sintering to form silicon-silicon carbide composite sintered bodies 26, and the porous layer 23 is also subjected to the reaction-sintering to form a joint portion 4. In other words, the ceramics composite member 1 is produced by integrating the two silicon-silicon carbide composite sintered bodies 26 undergone the reaction-sintering with the joint portion 4 also undergone the reaction-sintering at the same time as shown in FIG. 7D.

The carbon powder contained in the shaped bodies 24 reacts with the melted Si at a high temperature to produce silicon carbide. At the same time, the carbon powder contained in the porous layer 23 and the carbon component derived from the organic resin react with the melted Si at a high temperature to produce silicon carbide. Besides, the silicon-silicon carbide composite sintered bodies 26 and the joint portion 4 having a structure in which the free Si phase is continuously present in a network form among the silicon carbide particles can be obtained. When the joint portion 4 is formed, the two silicon-silicon carbide composite sintered bodies 26 are joined with high strength.

Thus, the two silicon-silicon carbide composite sintered bodies 26 (or the silicon-silicon carbide composite sintered body 26 and the other ceramics sintered body 21) can be coupled by the joint portion 4 which includes the SiC particles having an average particle diameter of 0.1 μm or more and 0.1 mm or less, and the free Si phase continuously provided in a net-like form in the interstices of the SiC particles and having an average diameter of 0.05 μm or more and 10 μm or less. As described above, the joint portion 4 has a texture which is comprised of the first SiC particles 5a based on the silicon carbide powder blended into the adhesive 22, the second SiC particles 5b which are produced by reacting the melted Si with the carbon powder blended into the adhesive 22 and the carbon derived from the organic resin, and the free Si phase 6 continuously provided in the network form in the interstices of the SiC particles 5a, 5b.

The joint portion 4 excels in bonding strength to the silicon-silicon carbide composite sintered body 26 and also excels in its own strength and reproducibility. Besides, the bonding strength between the silicon-silicon carbide composite sintered body 26 and the joint portion 4 is further improved by reaction-sintering at the same time. Thus, the two ceramic members 2, 3 can be bonded with high strength, and the strength of the ceramics composite member 1 after bonding can be improved with a good reproducibility. In addition, the cost required for bonding can be reduced. Therefore, the ceramics composite member 1 suitable for complex-shaped or large ceramic members can be provided with high strength at a low cost. The ceramics composite member 1 can be applied as various types of parts and members.

Then, specific examples of the invention and the evaluated results will be described.

Example 1

Silicon carbide powder having an average particle diameter of 0.5 μm and carbon powder (carbon black) having an average particle diameter of 0.01 μm were mixed at a mass ratio of 10:3 (=SiC:C). The mixture powder was mixed with an appropriate amount of an organic binder, and the mixture was dispersed into a solvent to prepare a slurry. The slurry was charged into a forming die under a pressure of 1 MPa by a pressure casting machine. Thus, two plate-like shaped bodies having a prescribed shaped body density were produced.

Then, the two plate-like shaped bodies were air dried and adhered with an adhesive. As the adhesive, a mixture of a phenol resin with silicon carbide powder having an average particle diameter of 0.1 μm and carbon powder (carbon black) having an average particle diameter of 0.08 μm was used. The ratio between the silicon carbide powder and the carbon component derived from the carbon powder and the phenol resin was determined to be SiC:C=25:75. The adhered material was heated and kept at a temperature of 500° C. in an inert gas atmosphere to change the adhesive layer to a porous layer. A preliminary coupling member having the two plate-like shaped bodies coupled with the porous layer was heated to a temperature of 1400° C. or more under reduced pressure or in an inert gas atmosphere, and the shaped bodies and the porous layer kept in the heated state were impregnated with the melted silicon.

In the melted silicon impregnation step, the two plate-like shaped bodies were subjected to reaction-sintering to produce an Si—SiC composite sintered body, and also a ceramics composite member was obtained by coupling them with a joint portion formed by reaction-sintering. The joint portion had a thickness of about 5 μm and a porosity of less than 1%. Besides, each surface of the joint portion was polished and its microstructure was observed with an electron microscope. It was confirmed that the joint portion had the texture in which the free Si phase was continuously provided in the network form in the interstices of the SiC particles. The joint portion had a single layer structure. The SiC particles had an average particle diameter of 0.1 μm. The free Si phase had an average diameter of 0.05 μm, and its content (composition ratio) was 10 mass %. The obtained ceramics composite member was subjected to the characteristic evaluation to be described later.

Example 2

Two shaped bodies produced in the same manner as in Example 1 described above were heated and kept at a temperature of 600° C. in an inert gas atmosphere to remove (degrease) the organic binder. The degreased shaped bodies were heated to a temperature of 1400° C. or more under reduced pressure or in an inert gas atmosphere, and the shaped bodies kept in the heated state were impregnated with melted silicon. In the melted silicon impregnation step, the shaped bodies were subjected to reaction-sintering to obtain two Si—SiC composite sintered bodies.

Then, the adhered surfaces of the two SiC radical reaction sintered bodies were subjected to a blast treatment and adhered with an adhesive. As the adhesive, a mixture of a phenol resin with silicon carbide powder having an average particle diameter of 1 µm and carbon powder (carbon black) having an average particle diameter of 0.8 µm was used. The ratio between the silicon carbide powder and the carbon component derived from the carbon powder and the phenol resin was determined to be SiC:C=30:70. The adhered material was heated and kept at a temperature of 500° C. in an inert gas atmosphere to change the adhesive layer to a porous layer. A preliminary coupling member having the two sintered bodies coupled with the porous layer was heated to a temperature of 1400° C. or more under reduced pressure or in an inert gas atmosphere, and the porous layer kept in the heated state was impregnated with the melted silicon.

In the melted silicon impregnation step, a ceramics composite member having the two Si—SiC composite sintered bodies coupled with a joint portion formed by reaction-sintering was produced. The joint portion had a thickness of about 20 µm and a porosity of 3%. Besides, the surfaces of the joint portion were polished and its microstructure was observed with an electron microscope. It was confirmed that the joint portion had the texture in which the free Si phase was continuously provided in the network form in the interstices of the SiC particles. The joint portion had a single layer structure. The SiC particles had an average particle diameter of 10 µm. The free Si phase had an average diameter of 0.1 and its content was 30 mass %. The obtained ceramics composite member was subjected to the characteristic evaluation to be described later.

Examples 3 to 10

As to-be-bonded members, an Si—SiC composite sintered body, shaped bodies for Si—SiC composite body, an ordinary SiC sintered body, an $Si_3N_4$ sintered body, a $ZrO_2$ sintered body and an SiC-continuous fiber composite material were prepared. They were coupled according to the combinations shown in Table 1 to produce ceramics composite members. The coupling step was performed in the same manner as in Examples 1 and 2. The adhesives used for coupling had the compositions as shown in Table 1. Table 1 also shows the properties of the joint portions. The joint portions of the ceramics composite members had the texture in which the free Si phase is continuously provided in the network form in the interstices of the SiC particles, and also had the single layer structure. The individual ceramics composite members were subjected to the characteristic evaluation to be described later.

Comparative Example 1

Two shaped bodies produced in the same manner as in Example 1 were mutually bonded with a silicon sheet held between them to produce a preliminary coupling member. The preliminary coupling member was impregnated with melted silicon in the same conditions as in Example 1. The obtained ceramics composite member was subjected to the characteristic evaluation to be described later.

Comparative Example 2

Two shaped bodies produced in the same manner as in Example 1 were mutually adhered with polycarbosilane to produce a preliminary coupling member. The preliminary coupling member was impregnated with melted silicon in the same conditions as in Example 1. The obtained ceramics composite member was subjected to the characteristic evaluation to be described later.

Comparative Example 3

Two shaped bodies produced in the same manner as in Example 1 were mutually adhered with a slurry, which was prepared by dispersing silicon carbide powder and carbon powder into a solvent, to produce a preliminary coupling member. The preliminary coupling member was impregnated with melted silicon in the same conditions as in Example 1. The obtained ceramics composite member was subjected to the characteristic evaluation to be described later.

TABLE 1

|  | To-be-bonded member 1 | To-be-bonded member 2 | Adhesive SiC:C (mass ratio) | Adhesive Organic resin |
|---|---|---|---|---|
| E1 | Shaped body for Si—SiC composite body | Shaped body for Si—SiC composite body | 25:75 | Phenol |
| E2 | Si—SiC composite sintered body | Si—SiC composite sintered body | 30:70 | Polyimide |
| E3 | SiC sintered body | SiC sintered body | 25:75 | Phenol |
| E4 | $Si_3N_4$ sintered body | $Si_3N_4$ sintered body | 30:70 | Epoxy |
| E5 | SiC-continuous fiber composite material | SiC-continuous fiber composite material | 25:70 | Polyimide |
| E6 | $ZrO_2$ sintered body | $ZrO_2$ sintered body | 30:70 | Epoxy |
| E7 | Shaped body for Si—SiC composite body | Shaped body for Si—SiC composite body | 75:25 | Epoxy |
| E8 | Shaped body for Si—SiC composite body | Shaped body for Si—SiC composite body | 30:70 | Polyimide |
| E9 | Shaped body for Si—SiC composite body | Shaped body for Si—SiC composite body | 75:25 | Epoxy |
| E10 | Shaped body for Si—SiC composite body | Shaped body for Si—SiC composite body | 60:40 | Phenol |
| CE1 | Shaped body for Si—SiC composite body | Shaped body for Si—SiC composite body | (Silicon sheet) | |
| CE2 | Shaped body for Si—SiC composite body | Shaped body for Si—SiC composite body | (Polycarbosilane) | |
| CE3 | Shaped body for Si—SiC composite body | Shaped body for Si—SiC composite body | 70:30 (Slurry) | |

E1 = Example 1;
E2 = Example 2;
E3 = Example 3;
E4 = Example 4;
E5 = Example 5;
E6 = Example 6;
E7 = Example 7;
E8 = Example 8;
E9 = Example 9;
E10 = Example 10,
CE1 = Comparative Example 1;
CE2 = Comparative Example 2;
CE3 = Comparative Example 3

The individual ceramics composite members according to Examples 1 to 10 and Comparative Examples 1 to 3 described above were measured for mechanical properties and thermal properties as follows. First, test pieces prepared from the joint portions which were mirror finished and whose microstructures were observed were used to measure the joint portions for a Vickers hardness. The results are shown in Table 2. The Vickers hardness is an average value of the individual examples.

Then, bending test pieces each having a width of 4 mm, a thickness of 3 mm and a length of 40 mm were produced from the individual ceramics composite members by machining. At that time, it was determined that the joint portion was perpendicular to the longitudinal direction of the test piece and positioned at the center of the test piece. Such bending test pieces were used to perform a four-point bending test (room temperature) under conditions of a span of 30 mm and a head speed of 0.5 mm/min. The results are shown in Table 2. The measured result by the bending test is an average value of the individual examples.

Besides, test pieces each having a diameter of 10 mm and a thickness of 2 mm for measurement of heat conductivity were produced from the individual ceramics composite members by machining. At that time, it was determined that the joint portion was parallel to the surface having a diameter of 10 mm and positioned at the center of the test piece. Such test pieces for measurement of heat conductivity were used to measure the heat conductivity at room temperature according to the method for testing the thermal diffusivity, specific heat capacity and thermal conductivity of fine ceramics by laser flash process (JIS R 1611). At the same time, the individual substrates were also measured for the heat conductivity. From the results, the heat conductivity of the joint portion was determined by calculating. The results are shown in Table 2.

diameter of 0.05 to 10 μm, the ceramics composite members having the joint portion with excellent strength and heat conductivity can be obtained.

Examples 11 to 18

Silicon carbide powder having an average particle diameter of 0.5 μm and carbon powder (carbon black) having an average particle diameter of 0.01 μm were mixed at a mass ratio of 10:3 (=SiC:C). Besides, the mixture powder was mixed with an appropriate amount of an organic binder, and the obtained mixture was dispersed into a solvent to prepare a slurry. The slurry was charged into a forming die under a pressure of 1 MPa by a pressure casting machine. Thus, one plate-like shaped body having a prescribed shaped body density was produced.

Then, as members to be bonded to the above-described plate-like shaped body, an Si—SiC composite sintered body, an SiC-continuous fiber composite material, an ordinary SiC sintered body, an $Si_3N_4$ sintered body and a $ZrO_2$ sintered body were prepared. The adhered surfaces of the individual to-be-bonded members were subjected to a blast treatment or an etching treatment with chemicals. The individual adhered

TABLE 2

| | Joint portion | | | | | | Heat |
| --- | --- | --- | --- | --- | --- | --- | --- |
| | Thickness (μm) | Porosity (%) | Average particle diameter of SiC particles (μm) | Average diameter of Si phase (μm) | Composition ratio of Si phase (mass %) | Hardness of joint portion (Hv) | Bending strength (MPa) | conductivity of joint portion (W/m · K) |
| E1 | 5 | >1 | 0.1 | 0.05 | 10 | 2200 | 1400 | 150 |
| E2 | 20 | 3 | 1 | 0.1 | 30 | 1700 | 900 | 130 |
| E3 | 50 | 3 | 10 | 1 | 50 | 1300 | 500 | 110 |
| E4 | 500 | 3 | 100 | 10 | 70 | 1000 | 350 | 90 |
| E5 | 40 | 3 | 5 | 0.5 | 25 | 1800 | 650 | 140 |
| E6 | 200 | 3 | 50 | 10 | 50 | 1300 | 400 | 110 |
| E7 | 500 | 2 | 200 | 15 | 50 | 1600 | 400 | 130 |
| E8 | 1000 | 2 | 10 | 0.1 | 30 | 1600 | 400 | 130 |
| E9 | 40 | 9 | 10 | 0.1 | 30 | 1600 | 350 | 90 |
| E10 | 40 | 2 | 10 | 0.1 | 85 | 900 | 350 | 90 |
| CE1 | 200 | 2 | — | — | 100 | 700 | 120 | 60 |
| CE2 | 200 | 20 | 10 | — | 0 | 1600 | 180 | 30 |
| CE3 | 200 | 5 | 10 | — | 50 | 1600 | 200 | 70 |

E1 = Example 1;
E2 = Example 2;
E3 = Example 3;
E4 = Example 4;
E5 = Example 5;
E6 = Example 6;
E7 = Example 7;
E8 = Example 8;
E9 = Example 9;
E10 = Example 10,
CE1 = Comparative Example 1;
CE2 = Comparative Example 2;
CE3 = Comparative Example 3

It is apparent from Table 2 that the ceramics composite members of Examples 1 to 10 had a Vickers hardness of HV900 to 2200, a four-point bending strength of 350 to 1400 MPa, and heat conductivity of 90 to 150 W/mK. It is seen that the ceramics composite members of Examples 1 to 10 have the joint portions excelling in mechanical properties and thermal properties in comparison with Comparative Examples 1 to 3. When it is determined that the microstructure of the joint portion has the texture in which the free Si phase is continuously provided in the network form in the interstices of the SiC particles, and the SiC particles have an average particle diameter of 0.1 to 100 μm and the free Si phase has an average surfaces had a surface roughness (Ra) of 1 to 10 μm. Then, the to-be-bonded members were adhered with the adhesives shown in Table 3. The adhered members were heated and kept at a temperature of 100 to 700° C. in an inert gas atmosphere to change the adhesive layers to porous layers. The porous layers had a porosity of 30 to 60%.

A preliminary coupling member having the to-be-bonded members coupled with the above-described porous layer was heated to a temperature of 1400° C. or more under reduced pressure or in an inert gas atmosphere. The shaped bodies and the porous layer kept in the heated state were impregnated with the melted silicon. The joint portion of the individual ceramics composite members obtained as described above had a texture in which the free Si phase was continuously provided in a net-like form among the SiC particles. The joint portions had a laminated structure with a different content of the Si phase. The properties of such joint portions are shown in Table 4. The mechanical properties and thermal properties of the individual ceramics composite members were measured in the same manner as in Example 1. The results are shown in Table 5.

TABLE 3

| | To-be-bonded member 1 | To-be-bonded member 2 | Adhesive SiC:C (mass ratio) | Organic resin |
|---|---|---|---|---|
| E11 | Shaped body for Si—SiC composite body | Si—SiC composite sintered body | 25:75 | Polyimide |
| E12 | Shaped body for Si—SiC composite body | SiC-continuous fiber composite material | 30:70 | Epoxy |
| E13 | Shaped body for Si—SiC composite body | SiC sintered body | 25:75 | Phenol |
| E14 | Shaped body for Si—SiC composite body | $Si_3N_4$ sintered body | 30:70 | Polyimide |
| E15 | Shaped body for Si—SiC composite body | $ZrO_2$ sintered body | 25:70 | Epoxy |
| E16 | Shaped body for Si—SiC composite body | Shaped body for Si—SiC composite body | 30:70 | Phenol |
| E17 | Shaped body for Si—SiC composite body | Shaped body for Si—SiC composite body | 25:75 | Polyimide |
| E18 | Shaped body for Si—SiC composite body | Shaped body for Si—SiC composite body | 30:70 | Phenol |

E11 = Example 11;
E12 = Example 12;
E13 = Example 13;
E14 = Example 14;
E15 = Example 15;
E16 = Example 16;
E17 = Example 17;
E18 = Example 18

TABLE 4

| | Joint portion (whole laminated structure) | | | | | Intermediate layer of joint portion | |
|---|---|---|---|---|---|---|---|
| | Thickness (μm) | Porosity (%) | Average particle diameter of SiC particles (μm) | Average diameter of Si phase (μm) | Composition ratio of Si phase (mass %) | Thickness (μm) | Composition ratio of Si phase (mass %) |
| E11 | 40 | 2 | 5 | 0.2 | 25 | 30 | 40 |
| E12 | 200 | 2 | 50 | 5 | 50 | 100 | 60 |
| E13 | 40 | 2 | 5 | 0.1 | 25 | 30 | 40 |
| E14 | 200 | 2 | 50 | 5 | 50 | 100 | 60 |
| E15 | 40 | 2 | 5 | 0.2 | 25 | 30 | 40 |
| E16 | 20 | >1 | 1 | 0.08 | 30 | 10 | 60 |
| E17 | 40 | >1 | 10 | 1 | 30 | 30 | 40 |
| E18 | 200 | >1 | 100 | 0.1 | 30 | 100 | 60 |

E11 = Example 11;
E12 = Example 12;
E13 = Example 13;
E14 = Example 14;
E15 = Example 15;
E16 = Example 16;
E17 = Example 17;
E18 = Example 18

TABLE 5

| | Hardness of joint portion (Hv) | Bending strength (Mpa) | Heat conductivity of joint portion (W/m · K) |
|---|---|---|---|
| Example 11 | 1700 | 900 | 130 |
| Example 12 | 1200 | 650 | — |
| Example 13 | 1700 | 700 | — |
| Example 14 | 1200 | 500 | — |
| Example 15 | 1700 | 600 | — |
| Example 16 | 1600 | 1200 | 130 |
| Example 17 | 1600 | 1000 | 130 |
| Example 18 | 1600 | 800 | 130 |

It is apparent from Table 4 and Table 5 that the mechanical properties and thermal properties of the ceramics composite member can be further improved by forming the joint portion to have a laminated structure having an intermediate layer with a high Si composition ratio and controlling the thickness of the intermediate layer and the Si composition ratio at that time.

What is claimed is:

1. A method of producing a ceramics composite member, comprising:
adhering a first ceramic member and a second ceramic member with an adhesive containing silicon carbide powder, carbon powder and an organic resin, wherein the organic resin is at least one selected from a phenol resin, an epoxy resin and a polyimide resin, a mass ratio of the silicon carbide powder and a total of the carbon powder and a carbon component derived from the organic resin in the adhesive is in a range of SiC:C=25 to 75:75 to 25, the silicon carbide powder in the adhesive has an average particle diameter in a range of 0.1 μm or more and 100 μm or less, and the carbon powder in the adhesive has an average particle diameter in a range of 0.08 μm or more and 20 μm or less;
thermally decomposing and carbonizing the organic resin in the adhesive by heat-treating the adhesive in an inert gas atmosphere kept at 500° C., to obtain a porous preliminary joint portion which is composed of the silicon carbide powder, the carbon powder and the carbon component derived from the organic resin, wherein the porous preliminary joint portion composed of the silicon carbide powder, the carbon powder, and the carbon component has a porosity in a range of 30 to 60%; and reaction-sintering the porous preliminary joint portion by impregnating the porous preliminary joint portion with melted silicon so that remaining silicon content in the porous preliminary joint portion is in a range of 10 to 50 mass % as a free silicon phase, to couple the first ceramic member and the second ceramic member with a joint portion which has a texture including silicon carbide particles and the free silicon phase continuously provided in a network form in interstices of the silicon carbide particles, wherein the silicon carbide particles in the joint portion have an average particle diameter of from 0.5 µm to 50 µm, and the joint portion contains the free silicon phase having an average diameter of from 0.05 µm to 10 µm in a range of 10 to 50 mass %.

2. The method of producing the ceramics composite member according to claim 1, wherein the silicon carbide particles configuring the joint portion include first silicon carbide particles, which are based on the silicon carbide powder contained in the adhesive, and second silicon carbide particles, which are produced by a reaction between the melted silicon, the carbon powder, and the carbon component derived from the organic resin contained in the adhesive, wherein the second silicon carbide particles have an average particle diameter smaller than that of the first silicon carbide particles.

3. The method of producing the ceramics composite member according to claim 1, wherein the first and second ceramic members are composed of the same or different kinds of ceramics sintered bodies selected from carbide, nitride, oxide, boride, silicide and their composites.

4. The method of producing the ceramics composite member according to claim 1, further comprising:

performing a blast treatment or an etching treatment on the adhered surfaces of the ceramic members.

5. A method of producing a ceramics composite member, comprising:

adhering shaped bodies each containing first silicon carbide powder and first carbon powder with an adhesive containing second silicon carbide powder, second carbon powder and an organic resin, wherein the organic resin is at least one selected from a phenol resin, an epoxy resin and a polyimide resin, a mass ratio of the second silicon carbide powder and a total of the second carbon powder and a carbon component derived from the organic resin in the adhesive is in a range of SiC:C=25 to 75:75 to 25, the second silicon carbide powder in the adhesive has an average particle diameter in a range of 0.1 µm or more and 100 µm or less, and the second carbon powder in the adhesive has an average particle diameter in a range of 0.08 µm or more and 20 µm or less;

thermally decomposing and carbonizing the organic resin in the adhesive by heat-treating the adhesive in an inert gas atmosphere kept at 500° C., to obtain a porous preliminary joint portion which is composed of the second silicon carbide powder, the second carbon powder and the carbon component derived from the organic resin, wherein the porous preliminary joint portion composed of the silicon carbide powder, the carbon powder, and the carbon component has a porosity in a range of 30 to 60%; and reaction-sintering the shaped bodies and the porous preliminary joint portion by impregnating the shaped bodies and the porous preliminary joint portion with melted silicon so that remaining silicon content in the porous preliminary joint portion is in a range of 10 to 50 mass % as a free silicon phase, to couple silicon-silicon carbide composite sintered bodies formed by the reaction-sintering with a joint portion which has a texture including silicon carbide particles and the free silicon phase continuously provided in a network form in interstices of the silicon carbide particles, wherein the silicon carbide particles in the joint portion have an average particle diameter of from 0.5 µm to 50 µm, and the joint portion contains the free silicon phase having an average diameter of from 0.05 µm to 10 µm in a range of 10 to 50 mass %.

6. The method of producing the ceramics composite member according to claim 5, wherein the silicon carbide particles configuring the joint portion include first silicon carbide particles, which are based on the second silicon carbide powder contained in the adhesive, and second silicon carbide particles, which are produced by a reaction between the melted silicon, the second carbon powder, and the carbon component derived from the organic resin contained in the adhesive, wherein the second silicon carbide particles have an average particle diameter smaller than that of the first silicon carbide particles.

7. A method of producing a ceramics composite member, comprising:

adhering a shaped body containing first silicon carbide powder and first carbon powder and a ceramics sintered body with an adhesive containing second silicon carbide powder, second carbon powder and an organic resin, wherein the organic resin is at least one selected from a phenol resin, an epoxy resin and a polyimide resin, a mass ratio of the second silicon carbide powder and a total of the second carbon powder and a carbon component derived from the organic resin in the adhesive is in a range of SiC:C=25 to 75:75 to 25, the second silicon carbide powder in the adhesive has an average particle diameter in a range of 0.1 µm or more and 100 µm or less, and the second carbon powder in the adhesive has an average particle diameter in a range of 0.08 µm or more and 20 µm or less;

thermally decomposing and carbonizing the organic resin in the adhesive by heat-treating the adhesive in an inert gas atmosphere kept at 500° C., to obtain a porous preliminary joint portion which is composed of the second silicon carbide powder, the second carbon powder and the carbon component derived from the organic resin, wherein the porous preliminary joint portion composed of the silicon carbide powder, the carbon powder, and the carbon component has a porosity in a range of 30 to 60%; and reaction-sintering the shaped body and the porous preliminary joint portion by impregnating the shaped body and the porous preliminary joint portion with melted silicon so that remaining silicon content in the porous preliminary joint portion is in a range of 10 to 50 mass % as a free silicon phase, to couple a silicon-silicon carbide composite sintered body formed by the reaction-sintering and the ceramics sintered body with a joint portion which has a texture including silicon carbide particles and the free silicon phase continuously provided in a network form in interstices of the silicon carbide particles, wherein the silicon carbide particles in the joint portion have an average particle diameter of from 0.5 μm to 50 μm, and the joint portion contains the free silicon phase having an average diameter of from 0.05 μm to 10 μm in a range of 10 to 50 mass %.

8. The method of producing the ceramics composite member according to claim 7,
wherein the silicon carbide particles configuring the joint portion include first silicon carbide particles, which are based on the second silicon carbide powder contained in the adhesive, and second silicon carbide particles, which are produced by a reaction between the melted silicon, the second carbon powder, and the carbon component derived from the organic resin contained in the adhesive,
wherein the second silicon carbide particles have an average particle diameter smaller than that of the first silicon carbide particles.

9. The method of producing the ceramics composite member according to claim 7,
wherein the ceramics sintered body is composed of carbide, nitride, oxide, boride, silicide, or their composites.

10. The method of producing the ceramics composite member according to claim 1,
wherein the mass ratio of the silicon carbide powder and the total of the carbon powder and the carbon component is in a range of SiC:C=25 to 75:30 to 70.

11. The method of producing the ceramics composite member according to claim 5,
wherein the mass ratio of the second silicon carbide powder and the total of the second carbon powder and the carbon component is in a range of SiC:C=25 to 75:30 to 70.

12. The method of producing the ceramics composite member according to claim 7,
wherein the mass ratio of the second silicon carbide powder and the total of the second carbon powder and the carbon component is in a range of SiC:C=25 to 75:30 to 70.

13. The method of producing the ceramics composite member according to claim 1,
wherein the average particle diameter of the silicon carbide particles in the joint portion is from 1 to 50 μm, the average diameter of the free silicon phase in the joint portion is from 0.1 to 10 μm, and a content of the free silicon phase in the joint portion in a range of 25 to 50 mass %.

14. The method of producing the ceramics composite member according to claim 5,
wherein the average particle diameter of the silicon carbide particles in the joint portion is from 1 to 50 μm, the average diameter of the free silicon phase in the joint portion is from 0.1 to 10 μm, and a content of the free silicon phase in the joint portion in a range of 25 to 50 mass %.

15. The method of producing the ceramics composite member according to claim 7,
wherein the average particle diameter of the silicon carbide particles in the joint portion is from 1 to 50 μm, the average diameter of the free silicon phase in the joint portion is from 0.1 to 10 μm, and a content of the free silicon phase in the joint portion in a range of 25 to 50 mass %.

* * * * *